Figure 4:
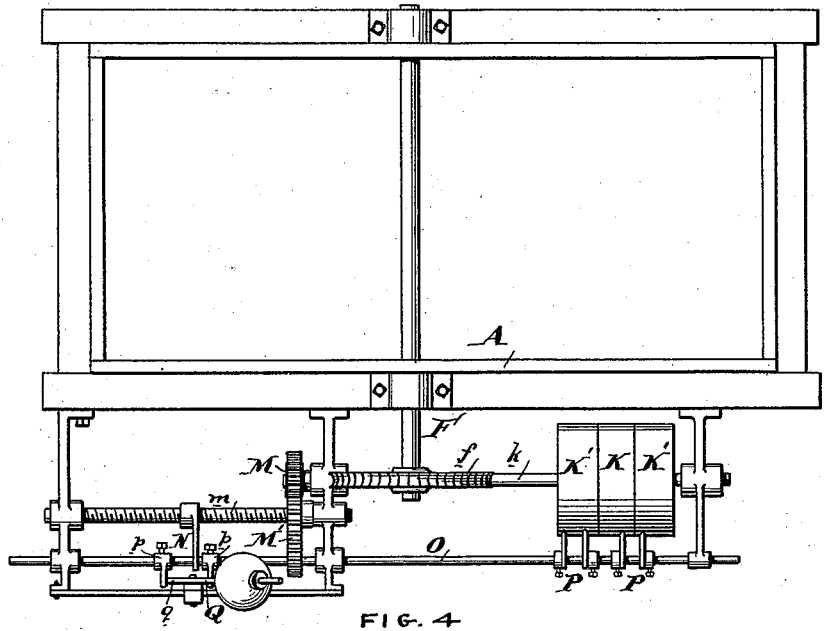

(No Model.) 2 Sheets—Sheet 1.
J. P. DELAHUNTY, Sr.
APPARATUS FOR DYEING OR SCOURING.
No. 417,708. Patented Dec. 24, 1889.
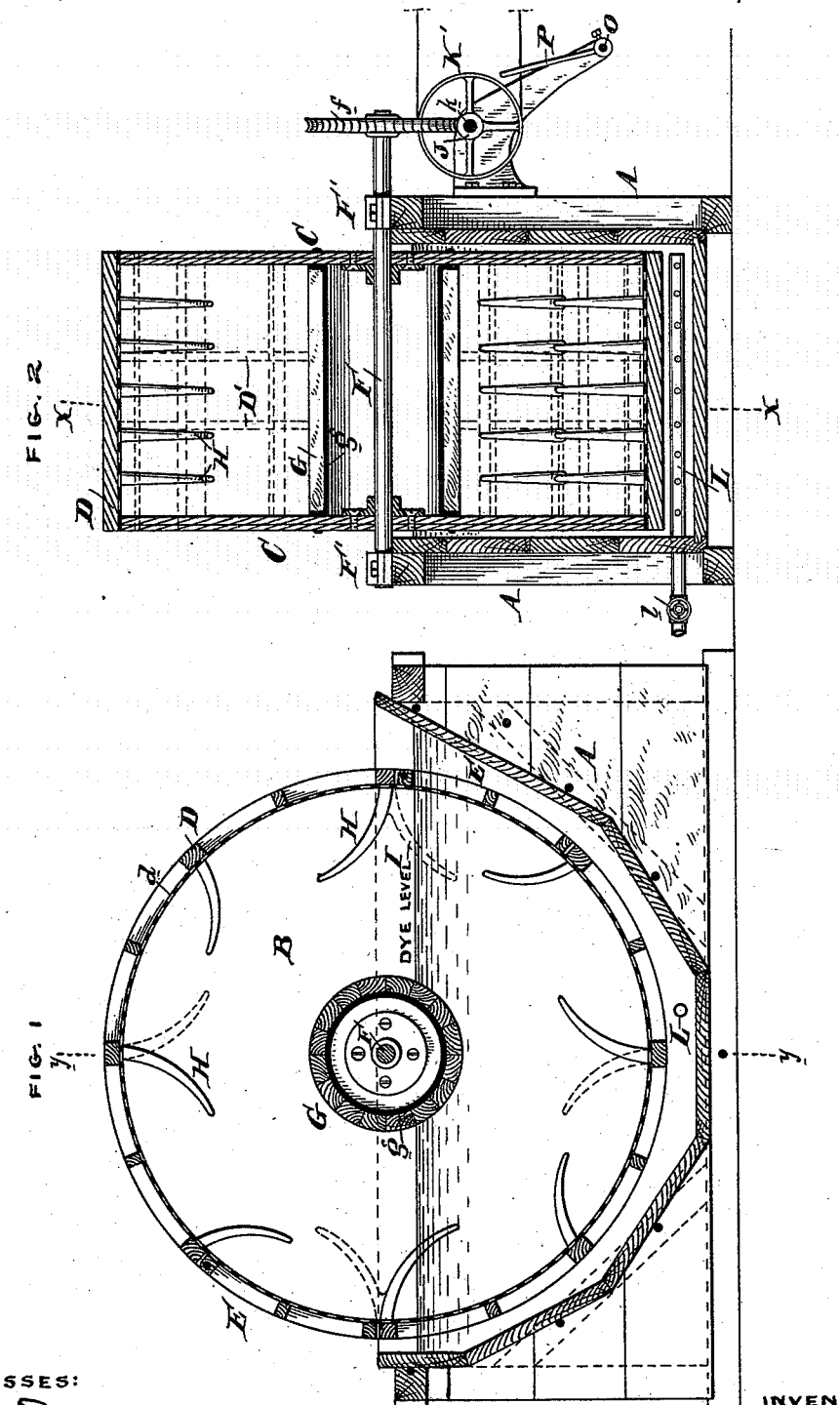
WITNESSES:
INVENTOR:
J. P. DELAHUNTY SR.
by his Atty.

(No Model.) 2 Sheets—Sheet 2.

J. P. DELAHUNTY, Sr.
APPARATUS FOR DYEING OR SCOURING.

No. 417,708. Patented Dec. 24, 1889.

WITNESSES:
Henry Drury

INVENTOR:
J. P. DELAHUNTY SR.
by his Atty.

UNITED STATES PATENT OFFICE.

JOSEPH P. DELAHUNTY, SR., OF PITTSTON, PENNSYLVANIA.

APPARATUS FOR DYEING OR SCOURING.

SPECIFICATION forming part of Letters Patent No. 417,708, dated December 24, 1889.

Application filed December 3, 1888. Serial No. 292,477. (No model.)

*To all whom it may concern:*

Be it known that I, JOSEPH P. DELAHUNTY, Sr., of Pittston, county of Luzerne, and State of Pennsylvania, have invented an Improvement in Dyeing and Scouring Machines, of which the following is a specification.

My invention has reference to dyeing or scouring machines; and it consists of certain improvements all of which are fully set forth in the following specification, and shown in the accompanying drawings, which form part thereof.

This invention is an improvement upon the machine shown in Letters Patent No. 305,155, dated September 16, 1884, and granted to me. In that application I show a revolving cylinder or cage of open-work arranged to rotate in a partly-submerged condition in the liquid in the vat or tank. In that construction I showed straight pins set obliquely, or part radial and part oblique, and the cylinder of open-work as provided with a central shaft having an inclosing central drum of wood. The cylinder or cage rotated always in the same direction.

In my present improvement the cylinder or cage is made specifically different from my former construction, being made with solid sides and heavy cross-bars at the periphery, and with perforated sheet metal or its equivalent wire-work secured upon the inner faces of said cross-bars, so that the interior of the cylinder or cage has no objectional offsets. In place of the straight pins of my former application I now employ curved fingers, preferably in rows and of different sizes. I also may employ two sets of these curved fingers in each row and make them point in opposite directions, so that the machine may operate in either direction of rotation. To do this I provide suitable automatic power apparatus for rotating the cylinder or cage in alternately-opposite directions.

In my present machine I have the following advantages: In dyeing raw stock or materials of certain kinds it was found that while the material being treated was required to be subjected to the liquor for a given time, owing to the steaming or boiling process, the dyeing was defective if the material was handled constantly.

In my present machine I am enabled to keep the material moving without the excessive handling—that is to say, I rotate the cylinder or cage intermittently in opposite directions, and while bringing the material alternately from one side to the other in position to be picked up I am enabled to gain a large portion of a revolution without actually packing up any material and exposing it to the air. By this manner of treatment I am enabled to keep the material moving, and in the time required for properly steaming the liquor I am required to expose the material to the atmosphere only for a limited time with the same speed of rotation of the cylinder or cage.

Another advantage of my machine lies in the employment of the curved-shaped fingers, which are well adapted to pick up the material or stock and at the proper time allow it to slip off and fall through the air into the liquor in the vat again. These curved fingers, with a given length, have great capacity for lifting and temporarily holding the stock during its passage through the air, and at the same time they are so formed that they freely allow the material to fall off them when turned to the proper angle. My invention is especially adapted to dyeing of raw stock, such as cotton fiber.

Figure 3:
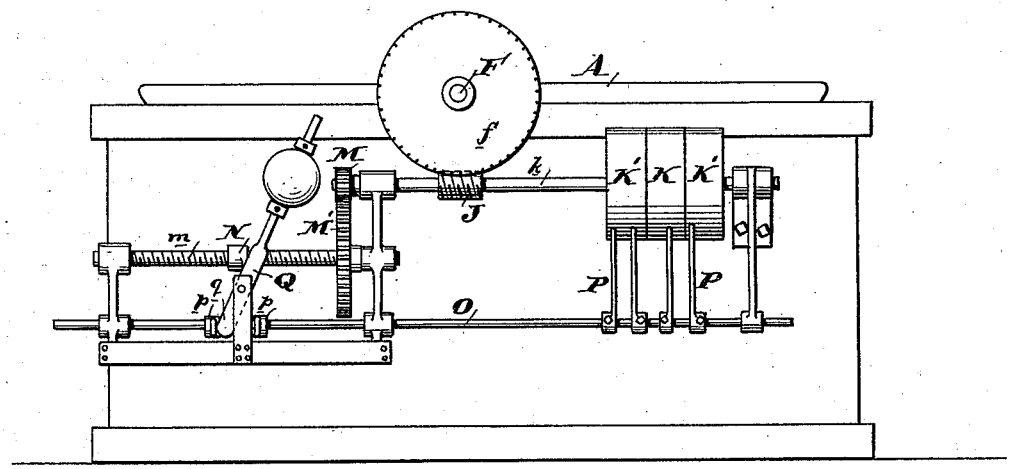

Referring now to the drawings, Figure 1 is a sectional side elevation on line $x$ $x$ of Fig. 2 of a dyeing or scouring machine embodying my improvements. Fig. 2 is a cross-section of same on line $y$ $y$ of Fig. 1. Fig. 3 is a side elevation of a special form of power mechanism for rotating the cylinder or cage; and Fig. 4 is a plan view of same.

A is the liquor-vat, and may be constructed in any suitable manner and of any suitable material.

B is the revolving cage or cylinder, having the solid sides C C and the cross-bars D about their peripheries and at considerable intervals apart. The interior surfaces of these cross-bars D act as supports for the copper or other metallic circumference-plates $d$, which have their surface perforated for the ready passage of dye-liquor and air. At one or more places the circumference of the cage is provided with doors E, formed of a frame of wood, covered on the inside with perforated sheet metal, to correspond to the rest of the circumference of the cage or cylinder. This cage or cylinder B is supported on an axle F, journaled in bearings F' on the tank or vat A, and is driven or rotated by a worm-wheel ƒ and worm J. Encircling the shaft F is a large metal drum g, having a covering of wood G, and adapted to rotate partly in and partly out of the liquid dye. This drum extends from side to side of the cylinder or cage, as shown in Fig. 2. Arranged upon the interior of the periphery or circumference of the cylinder B, in transverse rows, are the curved fingers H, starting inward at or about right angles to the circumference and gradually curving in the direction of rotation when in action, and also tapering toward the ends. In practice I prefer to make these curved fingers H of different lengths, arranging a row of long fingers and then a row of small fingers, as shown in Fig. 1, as it is found that they work, pick up the goods or stock, and handle it better. As the cylinder rotates, the goods or stock is carried through the liquid dye and then lifted up into the air and dropped, the small fingers dropping it sooner than the long fingers, which latter carry it up over and even beyond the drum G, allowing it to fall and re-enter the liquid. The drum G prevents the liquor getting on the axle and at the same time prevents the goods or stock from winding thereon.

L is the usual steam-pipe for blowing steam into the liquor in the vat or tank A, and may have a hand-valve l.

In addition to the transverse bars D the cage or cylinder may have one or more sets of circumferential bars D' (shown in Fig. 2 in dotted lines) to re-enforce the metal sheathing or covering.

In place of running the cylinder always in the same direction it may be rotated slowly in alternately-opposite directions, and when so used it is desirable that there be curved fingers I, pointing in a direction opposite to fingers H, which fingers I are shown in dotted lines. When the cage is running in either direction of its rotary reciprocation, the inactive curved fingers simply trail behind and do not interfere with the stock or goods being dyed. The advantage of the alternate rotation is to keep the material being treated under the liquor and in state of movement for a much longer time relative to the time of exposure to the atmosphere, for the reasons already set out. This peculiar treatment is particularly advantageous with raw stock. The material must not be allowed to remain quiet, and the action of the machine or the material must not be diminished, or injury will be done by the steaming process. My improved manipulation accomplishes the desired object without exposing the material to the atmosphere beyond a predetermined limit. The fingers H and I may be arranged in the same line and alternately, as shown.

I do not confine myself to any particular shape or arrangement of the fingers when pointing in opposite directions. Referring now to the mechanism shown in Figs. 3 and 4 for accomplishing the alternate rotary motion, it will be seen that said mechanism may be connected direct to the side of the machine or arranged overhead and connected by a belt.

$k$ is the power-shaft, and has the worm J, which gears with the wheel ƒ on the cylinder-shaft F, and also the driving-pulley K and two idler-pulleys K', one on each side of the driving-pulley. The shaft $k$ is also furnished with a pinion M, which meshes with a large spur-wheel M' on a screw-shaft $m$, having a traveling nut and arm N.

O is a shifter-rod having the belt-shifters P P, adapted to shift oppositely-running belts from pulleys K' onto K, alternately, or both off K. On the sliding shifter-rod O are two stops $p$ $p$, against which the traveling nut N strikes to shift the rod and belts.

Q is a pivoted and weighted lever having its bottom end $q$ adapted to act upon either of the stops $p$ $p$ and through the action of the weight, which is thrown upon either side of the fulcrum-point, cause the rod to be quickly shifted in either direction alternately.

The operation will now be understood. One belt being on one loose pulley K' and the other on the driving-pulley K, the shaft $k$, worm J, and pinion M are rotated in one direction. This rotates the screw-shaft $m$ by spur-wheel M' moving the nut N until it strikes a stop $p$ and commences to shift the rod O. When it has shifted the rod so as to throw off both belts from pulley K, the weighted lever Q is so moved that its weight passes to the other side of the fulcrum and the lower end $q$ strikes the stop $p$, being acted on by the nut N, and quickly shifts the other belt onto the pulley K and the motion is reversed. Any other reversing mechanism may be employed, that shown being only one way of accomplishing the desired result.

In using the word "cylinder" it is to be understood that I do not confine myself to the circumference being circular, as the cylinder may be polygonal in shape, as indicated in dotted lines, Fig. 1. I prefer, however, to make it substantially circular. The oppositely-pointed curved fingers may be formed into one base in place of being arranged side by side. (See at X, Fig. 1.) The best curve for these fingers is a parabolic curve, though I do not limit myself to any particular curvature.

Having now described my invention, what I claim as new, and desire to secure by Letters Patent, is—

1. In a dyeing or scouring machine, the combination of a dye or liquor tank or vat with a rotating cylinder partly submerged in the liquid in said tank or vat, and having its internal periphery provided with curved inwardly-projecting fingers.

2. In a dyeing or scouring machine, the combination of a dye or liquor tank or vat with a rotating cylinder partly submerged in the liquid in said tank or vat, having its internal periphery provided with curved inwardly-projecting fingers arranged in rows transversely across the cylinder and in which some of the curved fingers are longer than others.

3. In a dyeing or scouring machine, the combination of a dye or liquor tank or vat with a rotating cylinder having a circumference of open-work and partly submerged in the liquid in said tank or vat, and having its internal periphery provided with curved inwardly-projecting fingers arranged in rows transversely across the cylinder.

4. In a dyeing or scouring machine, the combination of a dye or liquor tank or vat with a rotating cylinder partly submerged in the liquid in said tank or vat and having its internal periphery provided with curved inwardly-projecting fingers, and further provided with a large central drum.

5. In a dyeing or scouring machine, the combination of a dye or liquor tank or vat with a rotating cylinder partly submerged in the liquid in said tank or vat and having its internal periphery provided with curved fingers pointing in opposite directions and extending inward.

6. In a dyeing or scouring machine, the combination of a dye or liquor tank or vat with a rotating cylinder partly submerged in the liquid in said tank or vat and having its internal periphery provided with a series of rows of curved fingers projecting inward, and in which a portion of the fingers of each row point in one direction and the remainder in the opposite direction.

7. In a dyeing or scouring machine, the combination of a dye or liquor tank or vat with a rotating cylinder partly submerged in the liquid in said tank or vat and having its internal periphery provided with a series of rows of curved fingers projecting inward and in which a portion of the fingers of each row point in one direction and the remainder in the opposite direction, and power mechanism for rotating said cylinder alternately in opposite directions.

8. In a dyeing or scouring machine, the combination of a dye or liquor tank or vat with a rotating cylinder partly submerged in the liquid in said tank or vat and having a large central drum and its internal periphery provided with curved fingers pointing in opposite directions and extending inwardly, and power mechanism for rotating said cylinder alternately in opposite directions.

9. A dye-vat, in combination with a rotating cylinder having its periphery formed of open-work and having inwardly-extending projections, and power mechanism for automatically rotating said cylinder alternately in opposite directions.

10. In a dyeing-machine, the vat or tank, in combination with a cylinder formed of two solid sides with heavy cross-bars D, upon the inner faces whereof is a covering of perforated sheet metal $d$, the said cylinder having inwardly-projecting fingers, and a central supporting-shaft F.

11. In a dyeing-machine, the vat or tank, in combination with a cylinder formed of two solid sides with heavy cross-bars D, upon the inner faces whereof is a covering of perforated sheet metal $d$, the said cylinder having inwardly-projecting fingers, a central supporting-shaft F, and a large inclosing central drum G.

12. In a dyeing or scouring machine, the combination of a tank or vat to hold the dye or other liquor, a rotating cage or cylinder of large diameter partly submerged in the liquor in the vat and having its surface furnished with open-work to permit of the passage of the liquor and air, and also having at its internal circumferential surface fingers or projections pointing internally in opposite directions.

In testimony of which invention I hereunto set my hand.

JOSEPH P. DELAHUNTY, SR.

Witnesses:
 R. M. HUNTER,
 ERNEST HOWARD HUNTER.